(12) United States Patent
McKenzie et al.

(10) Patent No.: US 9,360,215 B2
(45) Date of Patent: Jun. 7, 2016

(54) COMBUSTOR HAVING A BEVELED GROMMET

(75) Inventors: Crisen McKenzie, West Hartford, CT (US); Timothy S. Snyder, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 1062 days.

(21) Appl. No.: 13/437,247

(22) Filed: Apr. 2, 2012

(65) Prior Publication Data
US 2013/0255269 A1    Oct. 3, 2013

(51) Int. Cl.
*F23R 3/06*    (2006.01)
*F23R 3/00*    (2006.01)
*F23R 3/50*    (2006.01)

(52) U.S. Cl.
CPC . *F23R 3/007* (2013.01); *F23R 3/06* (2013.01); *F23R 3/50* (2013.01)

(58) Field of Classification Search
CPC .............. F23R 3/04; F23R 3/045; F23R 3/06; F23R 3/26; F23R 3/46; F23R 3/50; F23R 3/54; F23R 2900/00005
See application file for complete search history.

(56) References Cited

U.S. PATENT DOCUMENTS

| 3,545,202 A | | 12/1970 | Batt |
| 3,990,837 A | * | 11/1976 | Snell .............................. 60/752 |
| 4,054,028 A | * | 10/1977 | Kawaguchi .................. 60/39.23 |
| 4,132,066 A | | 1/1979 | Austin, Jr. et al. |
| 4,622,821 A | | 11/1986 | Madden |

(Continued)

FOREIGN PATENT DOCUMENTS

EP    2211106    7/2010

OTHER PUBLICATIONS

International Preliminary Report on Patentability for PCT Application No. PCT/US2013/034515, mailed Oct. 16, 2014.

(Continued)

*Primary Examiner* — Arun Goyal
(74) *Attorney, Agent, or Firm* — Carlson, Gaskey & Olds, P.C.

(57) ABSTRACT

A combustor includes a shell that at least partially defines a combustion chamber and a grommet mounted in the shell. The grommet has a body that defines a passage through the grommet that is operable to communicate air from outside the combustion chamber into the combustion chamber. The body carries a first surface, an opposite, second surface and a third surface that defines the passage and joins the first surface and the second surface. The third surface includes a bevel surface with respect to at least one of the first surface and the second surface.

12 Claims, 3 Drawing Sheets

(56) References Cited

U.S. PATENT DOCUMENTS

| | | | |
|---|---|---|---|
| 4,700,544 A | 10/1987 | Fucci | |
| 4,887,432 A * | 12/1989 | Mumford et al. | 60/759 |
| 5,138,841 A | 8/1992 | Skidmore | |
| 5,187,937 A | 2/1993 | Stevens et al. | |
| 5,749,219 A * | 5/1998 | DuBell | 60/804 |
| 6,446,582 B1 | 9/2002 | Duong et al. | |
| 6,668,559 B2 * | 12/2003 | Calvez et al. | 60/796 |
| 7,013,634 B2 * | 3/2006 | Pidcock et al. | 60/39.821 |
| 7,543,383 B2 | 6/2009 | Patel et al. | |
| 8,047,008 B2 * | 11/2011 | Lebegue et al. | 60/798 |
| 8,387,397 B2 * | 3/2013 | Chen et al. | 60/759 |
| 9,038,395 B2 * | 5/2015 | Rudrapatna et al. | 60/754 |
| 2002/0184889 A1 | 12/2002 | Calvez | |
| 2010/0242483 A1 | 9/2010 | Snyder et al. | |
| 2010/0257864 A1 | 10/2010 | Prociw et al. | |
| 2011/0120134 A1 | 5/2011 | Hoke et al. | |

OTHER PUBLICATIONS

International Search Report and Written Opinion for International Application No. PCT/US2013/034515 completed on Jun. 21, 2013.
European Search Report for European Patent Application No. 13772231.0 completed Oct. 19, 2015.

* cited by examiner

COMBUSTOR HAVING A BEVELED GROMMET

BACKGROUND

This disclosure relates to annular combustors and, more particularly, to grommets used in annular combustors.

Annular combustors of gas turbine engines typically include an inner liner that is radially spaced from an outer liner to define an annular combustion chamber there between. A bulkhead panel is provided at a forward end of the chamber to shield a forward section of the combustor from the relatively high temperatures in the chamber. Additionally, relatively cool air from outside of the combustor is directed through quench ports in the liners to control temperature of the combustion gases in the chamber.

SUMMARY

A combustor according to one aspect of this disclosure includes a shell at least partially defining a combustion chamber and a grommet mounted in the shell. The grommet has a body defining a passage through the grommet that is operable to communicate air from outside the combustion chamber into the combustion chamber. The body carries a first surface, an opposite, second surface and a third surface defining the passage and joining the first surface and the second surface. The third surface includes a bevel surface with respect to at least one of the first surface and the second surface.

In a further embodiment of any of the disclosed examples, the grommet includes a circumferential flange.

In a further embodiment of any of the disclosed examples, the bevel surface is angled at about 35°-55° with regard to a central axis of the passage.

In a further embodiment of any of the disclosed examples, the bevel surface is angled at about 45° with regard to a central axis of the passage.

In a further embodiment of any of the disclosed examples, the grommet defines an axial thickness (t) with regard to a central axis of the passage and the bevel surface defines an axial length component (L1) such that a ratio L1/t is 0.1-0.4.

In a further embodiment of any of the disclosed examples, the passage has a diameter (D) and the bevel surface defines a radial length component (L2) such that a ratio L2/D is about 0.05-0.09.

In a further embodiment of any of the disclosed examples, the grommet defines an axial thickness (t) with regard to a central axis of the passage and the bevel surface defines an axial length component (L1) and a radial length component L2 such that a ratio L1/t is about 0.1-0.4 and a ratio L2/D is about 0.05-0.09.

In a further embodiment of any of the disclosed examples, the grommet is a separate and distinct piece from the annular shell.

In a further embodiment of any of the disclosed examples, the bevel surface extends over an axial length component L1 and over a radial length component L2 with regard to a central axis of the passage, and L1 is equal to L2.

In a further embodiment of any of the disclosed examples, the shell includes heat shield panels and a peripheral wall, and the grommet includes a circumferential flange that is arranged between the heat shield panels and the peripheral wall.

A turbine engine according to one aspect of this disclosure includes a compressor section, a combustor in fluid communication with the compressor section and a turbine section in fluid communication with the combustor. The combustor includes a shell at least partially defining a combustion chamber and a grommet mounted in the shell. The grommet has a body defining a passage through the grommet that is operable to communicate air from outside the combustion chamber into the combustion chamber. The body carries a first surface, an opposite, second surface and a third surface defining the passage and joining the first surface and the second surface. The third surface includes a bevel surface with respect to at least one of the first surface and the second surface.

In a further embodiment of any of the disclosed examples, the grommet includes a circumferential flange.

In a further embodiment of any of the disclosed examples, the bevel surface is angled at 35°-55° with regard to a central axis of the passage.

In a further embodiment of any of the disclosed examples, the grommet defines an axial thickness (t) with regard to a central axis of the opening and the bevel surface defines an axial length component (L1) such that a ratio L1/t is 0.1-0.4, and the passage defines a diameter (D) and the bevel surface defines a radial length component (L2) such that a ratio L2/D is 0.05-0.09.

In a further embodiment of any of the disclosed examples, the bevel surface extends over an axial length component L1 with regard to a central axis of the passage and over a radial length component L2 that is equal to L1.

A method of controlling quench flow into a combustor according to one aspect of this disclosure includes:

providing a shell at least partially defining a combustion chamber and a grommet mounted in the shell, the grommet having a body defining a passage through the grommet that is operable to communicate air from outside the combustion chamber into the combustion chamber, the body carrying a first surface, an opposite, second surface and a third surface defining the passage and joining the first surface and the second surface;

providing the third surface with a bevel with respect to at least one of the first surface and the second surface, the bevel defining a bevel size; and selecting the bevel size to reduce variation in a coefficient of discharge of flow of the air through the passage.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION OF THE PREFERRED EMBODIMENT

Figure 1:
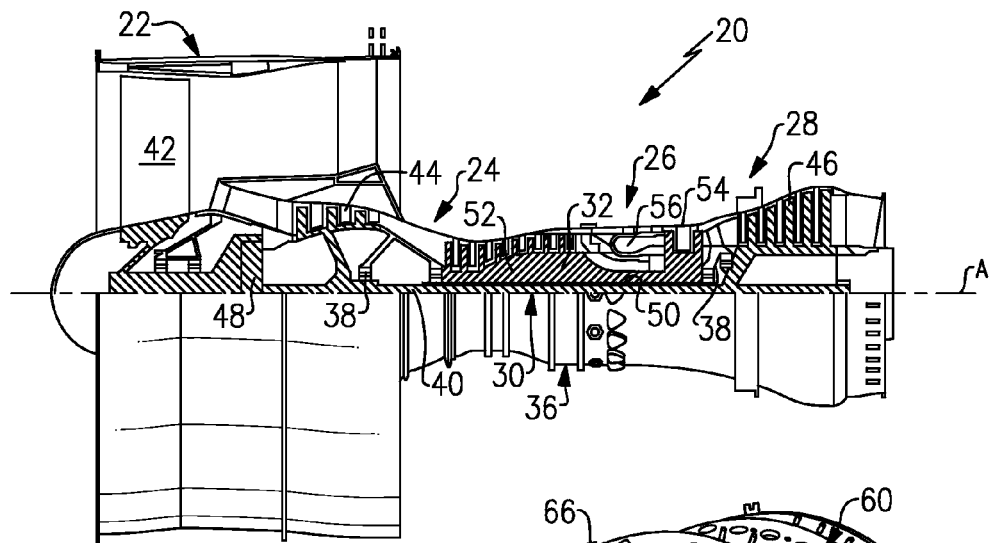
FIG. 1 illustrates an example gas turbine engine.

FIG. 1 schematically illustrates a gas turbine engine 20. The gas turbine engine 20 is disclosed herein as a high bypass, two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath. The compressor section 24 receives air along a core flowpath for compression and presentation into the combustor section 26. Although depicted as a turbofan gas turbine engine in the disclosed non-limiting embodiment, it should be understood that the concepts described herein are not limited to use with turbofans and the teachings may be applied to other types of turbine engines, including three-spool architectures.

The engine 20 generally includes a low spool 30 and a high spool 32 mounted for rotation about an engine central longitudinal axis A relative to an engine static structure 36 via several bearing systems 38. It is to be understood that various bearing systems 38 at various locations may alternatively or additionally be provided.

The low spool 30 generally includes an inner shaft 40 that couples a fan 42 (i.e. the fan section 22), a low pressure compressor 44 of the compressor section 24 and a low pressure turbine 46 of the turbine section 28. The inner shaft 40 is coupled to the fan 42 through a geared architecture 48 to rotate the fan 42 at a lower speed than the low spool 30. The high spool 32 includes an outer shaft 50 that couples a high pressure compressor 52 of the compressor section 24 and high pressure turbine 54 of the turbine section 28. A combustor 56 (i.e. the combustor section 26) is arranged between the high pressure compressor 52 and the high pressure turbine 54. Although the combustor 56 of this example is annular, it is to be understood that the combustor 56 could alternatively be a can-type combustor.

The core airflow is compressed by the low pressure compressor 44 then the high pressure compressor 52, mixed and burned with fuel in the combustor 56, then expanded over the high pressure turbine 54 and low pressure turbine 46. The turbines 46 and 54 rotationally drive the respective low spool 30 and high spool 32 in response to the expansion.

Figure 2A:
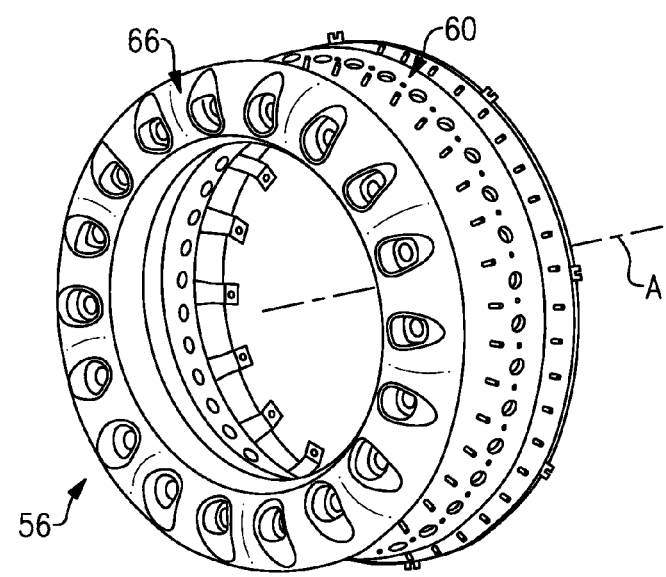
FIG. 2A illustrates a perspective view of a combustor.
Figure 2B:
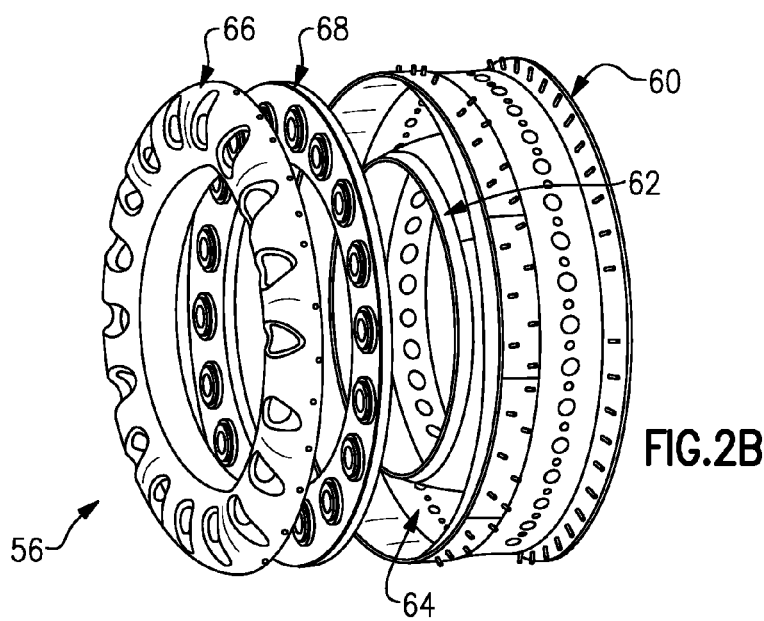
FIG. 2B illustrates an exploded view of the combustor of FIG. 2A.

FIG. 2A shows a perspective, isolated view of the combustor 56, and FIG. 2B illustrates an exploded view of the combustor 56. The combustor 56 may be a 4-piece construction that includes an annular or cylindrical outer shell 60, an annular or cylindrical inner shell 62 that is spaced radially inwards of the annular outer shell 60 to define an annular combustion chamber 64 there between, an annular hood 66 and a bulkhead 68. The annular outer shell 60, the annular inner shell 62, the annular hood 66 and the bulkhead 68 each extend circumferentially around the engine central longitudinal axis A. Of source, the specific design of the combustor 56 may differ from the illustrated, non-limiting example.

Figure 3:
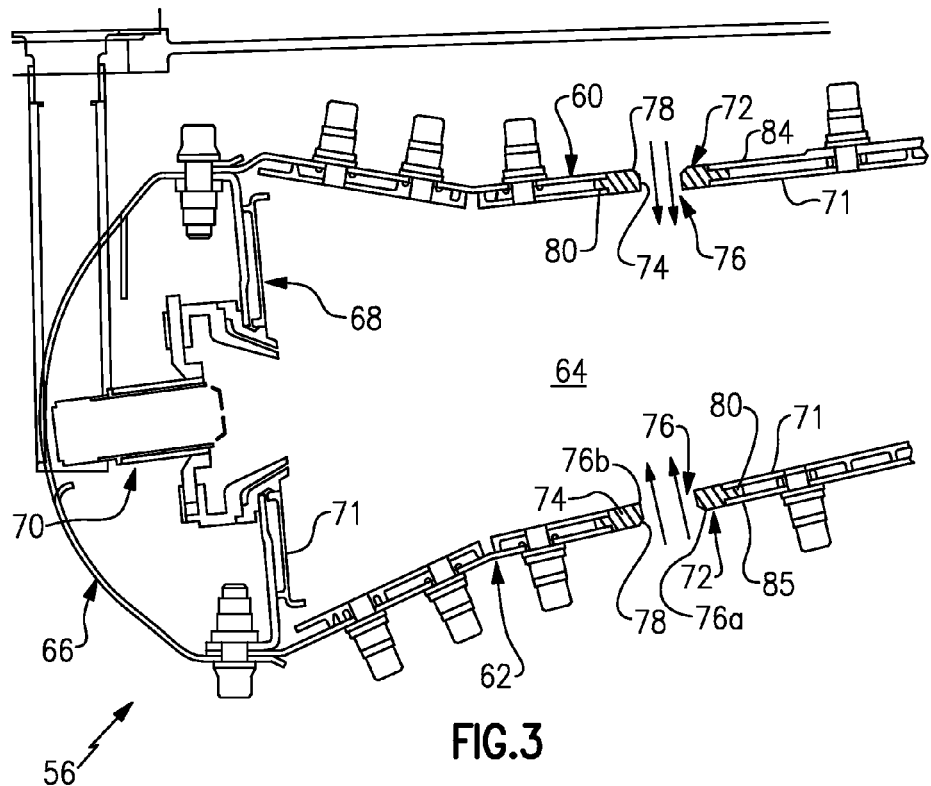
FIG. 3 illustrates a cross-section of a combustor.

FIG. 3 shows a cross-section of the combustor 56. The combustor 56 receives a fuel supply through a fuel nozzle 70. The fuel supply is ignited and injected into the annular combustion chamber 64. To resist the high combustion temperatures, the annular outer shell 60, the annular inner shell 62 and the bulkhead 68 include heat shield panels 71, which may be effusion cooled.

The combustor 56 includes one or more grommets 72. In this example, each of the grommets 72 are mounted in either the annular outer shell 60 or the annular inner shell 62. Each of the grommets 72 includes a body 74 that defines a passage 76 through the respective grommet 72, which serves as a quench port. The passage 76 extends generally radially between an inlet opening 76a and an outlet opening 76b. The grommets 72 are thus operable to communicate air from outside the combustor 56 into the annular combustion chamber 64.

The operating pressure within the annular combustion chamber 64 is lower than the air pressure in the surrounding environment outside of the combustor 56. This pressure differential drives surrounding air into the annular combustion chamber 64. Although an influx of surrounding air is desired, variance in the flow of the air into the annular combustion chamber 64 is undesirable and can debit the performance of the combustor 56 by altering the combustion stoichiometry and/or generating undesirable emission products. As will be described below, the grommet 72 includes a bevel surface 78 that acts as a funnel for controlling air flow through the opening 76.

Figure 4:
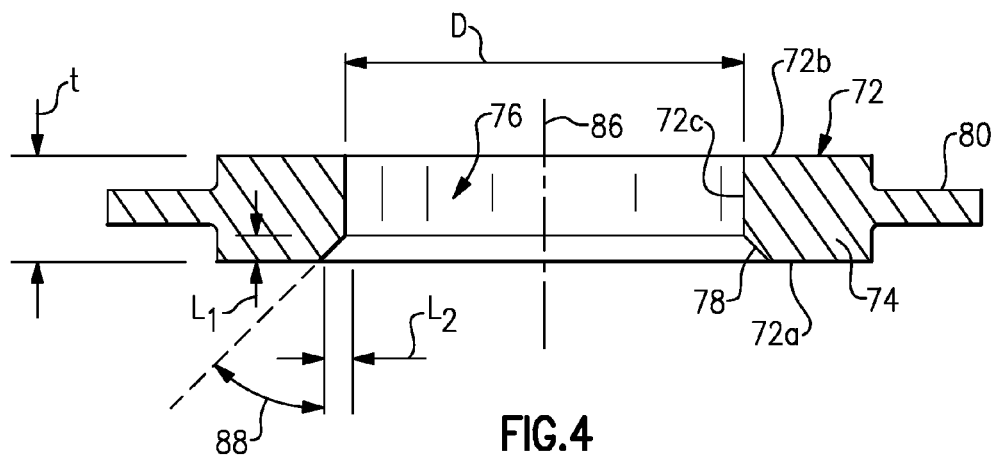
FIG. 4 illustrates a cross-section of a grommet of a combustor.

FIG. 4 shows a cross section of the grommet 72. In one example, the body 74 of the grommet 72 is made of a metallic material, such as a nickel-based alloy or a steel alloy. The body 74 carries a first surface 72a, an opposite, second surface 72b and a third surface 72c defining the passage 76 and joining the first surface 72a and the second surface 72b. The third surface 72c includes the bevel surface 78. The bevel surface 78 is inclined with respect to at least one of the first surface 72a or the second surface 72b. The third surface 72c, exclusive of the bevel surface 78, is substantially cylindrical. In this example, the bevel surface 78 is frutoconical. Alternatively, the bevel surface 78 could be rounded to a specified radius.

A circumferential flange 80 extends radially outward from the body 74. As shown in FIG. 3, the circumferential flange 80 is arranged between heat shield panels 71 and a peripheral wall 84, 85 of the respective annular outer shell 60 and the annular inner shell 62 to hold the grommet in position such that the grommet 72 is generally flush with the heat shield panels 71. In a further example, the grommet 72 may be coined to match the curvature of the annular outer shell 60 or the annular inner shell 62 to provide a tight fit that reduces leakage by the grommet 72. The bevel surface 78 is located on the side of the grommet 72 at the respective peripheral wall 84, 85 and serves as an inlet lip for air flow into the combustor 56.

Figure 5:
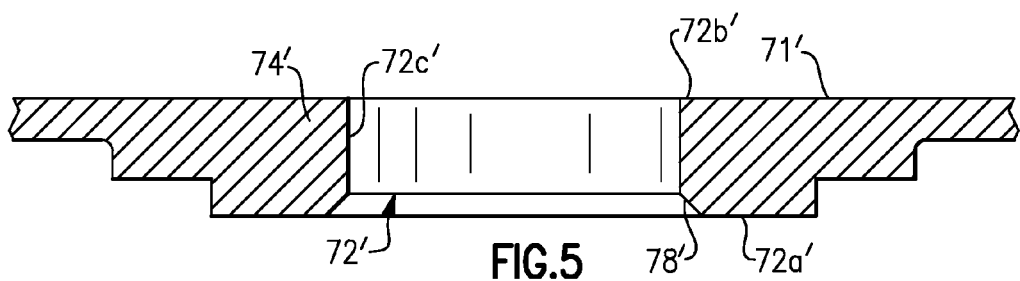
FIG. 5 illustrates a cross-section of another example grommet of a combustor.

In this example, the grommet 72 is a separate and distinct piece from the annular outer shell 60 and the annular inner shell 62. In a modified example shown in the cross section of FIG. 5, the grommet 72' is integrated as a unitary structure with the heat shield panel 71', or alternatively the peripheral wall 84. In this disclosure, like reference numerals designate like elements where appropriate and reference numerals with the addition of a prime, one-hundred or multiples thereof designate modified elements that are understood to incorporate the same features and benefits of the corresponding elements.

Referring to FIG. 4, the passage 76 through the grommet 72 extends along a central axis 86. With respect to the central axis 86, the grommet 72 has an axial thickness (t) and the passage 76 has diameter (D). As an example, the axial thickness (t) is or is about 0.1-0.3 inches (0.254-0.762 centimeters) and the diameter (D) is or is about 0.4-0.7 inches (1.016-1.778 centimeters). An angle 88 is defined between the bevel surface 78 and the central axis 86. In one example, the angle 88 is or is about 35°-55°. In a further example, the angle 88 is or is about 45° for enhanced flow funneling.

The bevel surface 78 also defines an axial length component L1 and a radial length component L2, with regard to axial and radial directions defined relative to the central axis 86. In one example, the axial length component L1 and the radial length component L2 are equal and are each 0.35 inches (0.889 centimeters). It is to be understood that the axial length component L1 and the radial length component L2 may be varied from the disclosed length and may be non-equal. For example, L2 can be varied to vary the angle 88. The angle 88, the axial length component L1, the radial length component L2, the thickness (t) and the diameter (D) geometrically define the grommet 72 and the bevel surface 78.

The geometry influences air flow through the opening 76. For example, in a prior art grommet that does not include the bevel surface 78, the relatively abrupt corners of the wall of the grommet, known as break edges, induce variation in the air flow through the opening. The variation in the air flow is represented by a coefficient of discharge. The coefficient of discharge is defined as an effective cross-sectional flow area divided by the cross-sectional area of the opening. The bevel surface 78, and specifically the selection of the geometry of the grommet 72 and the bevel surface 78, influences the coefficient of discharge. As will be described in more detail below, proper selection of the geometry of the grommet 72 and the bevel surface 78 reduces variation in the coefficient of discharge and thus reduces variation in air flow through the opening 76 compared to grommets that include cylindrical openings without a bevel surface. The reduction in variability of the air flow provides greater control over the temperature distribution of the combustion gases in the annular combustion chamber 64.

In one example, a set of ratios is used to represent geometric relationships that reduce variation in the coefficient of discharge. For example, for the disclosed angles 88 described above, the geometry is selected such that a ratio L1/t is 0.1-0.4 and a ratio L2/D is 0.05-0.09. In a further example, the ratio L1/t is about 0.2 and the ratio L2/D is about 0.06.

Figure 6:
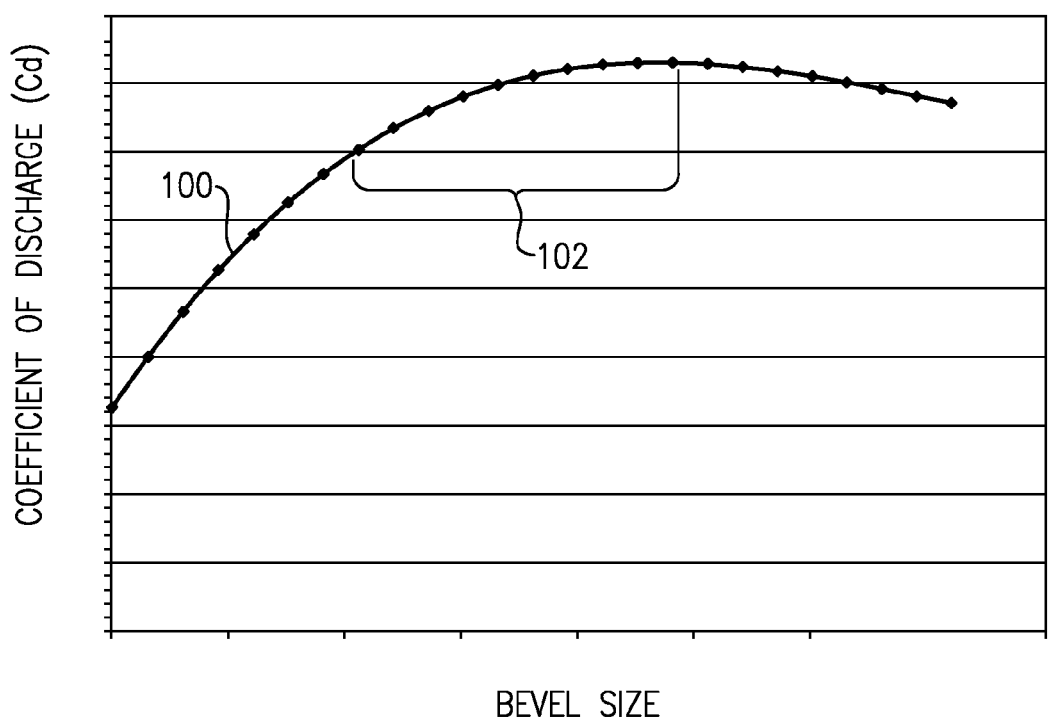
FIG. 6 illustrates a graph of coefficient of discharge through a passage in a grommet versus bevel size.

FIG. 6 shows a graph of coefficient of discharge versus bevel size, assuming the axial length component L1 and the radial length component L2 are equivalent and the angle 88 is 45°. The bevel size in this example is the axial length component L1. In the graph, the line 100 represents a trend line of the change in the coefficient of discharge over different axial length components L1. The slope of the trend line 100 begins to flatten out within range 102. Assuming that the coefficient of discharge will vary along the trend line 100 due to dimensional tolerances of the bevel size, variation in the coefficient of discharge is reduced by selecting a bevel size within the range 102.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A combustor comprising:
   a shell at least partially defining a combustion chamber, the shell including heat shield panels and a peripheral wall;
   plurality of quench ports for introducing air from outside the peripheral wall into the combustion chamber; and
   a grommet mounted in the shell within the plurality of quench ports, the grommet having a body defining a passage through the grommet that is operable to communicate air from outside the combustion chamber into the combustion chamber, the body carrying a first surface, an opposite, second surface and a third surface defining the passage and joining the first surface and the second surface, the third surface including a bevel surface with respect to at least one of the first surface and the second surface, and the grommet includes a circumferential flange that is arranged between the heat shield panels and the peripheral wall;
   wherein the grommet is flush with at least the heat shield panels, and wherein the grommet is also flush with the peripheral wall.

2. The combustor as recited in claim 1, wherein the bevel surface is angled at about 35°-55° with regard to a central axis of the passage.

3. The combustor as recited in claim 2, wherein the bevel surface is angled at about 45° with regard to a central axis of the passage.

4. The combustor as recited in claim 1, wherein the grommet defines an axial thickness (t) with regard to a central axis of the passage and the bevel surface defines an axial length component (L1) such that a ratio L1/t is 0.1-0.4.

5. The combustor as recited in claim 1, wherein the passage has a diameter (D) and the bevel surface defines a radial length component (L2) such that a ratio L2/D is about 0.05-0.09.

6. The combustor as recited in claim 1, wherein the grommet defines an axial thickness (t) with regard to a central axis of the passage and the bevel surface defines an axial length component (L1) and a radial length component L2 such that a ratio L1/t is about 0.1-0.4 and a ratio L2/D is about 0.05-0.09.

7. The combustor as recited in claim 1, wherein the grommet is a separate and distinct piece from the shell.

8. A turbine engine comprising:
   a compressor section;
   a combustor in fluid communication with the compressor section; and
   a turbine section in fluid communication with the combustor,
   the combustor including:
     a shell at least partially defining a combustion chamber, the shell including heat shield panels and a peripheral wall,
     plurality of quench ports for introducing air from outside the peripheral wall into the combustion chamber; and
     a grommet mounted in the shell within the plurality of quench ports, the grommet having a body defining a passage through the grommet that is operable to communicate air from outside the combustion chamber into the combustion chamber, the body carrying a first surface, an opposite, second surface and a third surface defining the passage and joining the first surface and the second surface, the third surface including a bevel surface with respect to at least one of the first surface and the second surface, and the grommet includes a circumferential flange that is arranged between the heat shield panels and the peripheral wall;
     wherein the grommet is flush with at least the heat shield panels, and wherein the grommet is also flush with the peripheral wall.

9. The turbine engine as recited in claim 8, wherein the bevel surface is angled at 35°-55° with regard to a central axis of the passage.

10. The turbine engine as recited in claim 8, wherein the grommet defines an axial thickness (t) with regard to a central axis of the opening and the bevel surface defines an axial length component (L1) such that a ratio L1/t is 0.1-0.4, and the passage defines a diameter (D) and the bevel surface defines a radial length component (L2) such that a ratio L2/D is 0.05-0.09.

11. The turbine engine as recited in claim 8, wherein the bevel surface extends over an axial length component L1 with regard to a central axis of the passage and over a radial length component L2 that is equal to L1.

12. A combustor comprising:
a shell at least partially defining a combustion chamber, the shell including heat shield panels and a peripheral wall;
plurality of quench ports for introducing air from outside the peripheral wall into the combustion chamber; and
a grommet mounted in the shell within the plurality of quench ports, the grommet having a body defining a passage through the grommet that is operable to communicate air from outside the combustion chamber into the combustion chamber, the body carrying a first surface, an opposite, second surface and a third surface defining the passage and joining the first surface and the second surface, the third surface including a bevel surface with respect to at least one of the first surface and the second surface, and the grommet is flush with at least the heat shield panels, and wherein the grommet is also flush with the peripheral wall.

* * * * *